US009350712B2

(12) United States Patent
Han et al.

(10) Patent No.: US 9,350,712 B2
(45) Date of Patent: May 24, 2016

(54) PACKET ANALYSIS APPARATUS AND METHOD AND VIRTUAL PRIVATE NETWORK SERVER

(71) Applicant: ELECTRONICS AND TELECOMMUNICATIONS RESEARCH INSTITUTE, Daejeon (KR)

(72) Inventors: YuJeong Han, Daejeon (KR); Jung Hwan Moon, Daejeon (KR); Dong Su Nam, Daejeon (KR); HyungGeun Oh, Daejeon (KR); Kiwook Sohn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/470,604

(22) Filed: Aug. 27, 2014

(65) Prior Publication Data

US 2015/0195251 A1 Jul. 9, 2015

(30) Foreign Application Priority Data

Jan. 9, 2014 (KR) .......................... 10-2014-0002912

(51) Int. Cl.
H04L 29/06 (2006.01)
(52) U.S. Cl.
CPC ............ *H04L 63/0272* (2013.01); *H04L 63/14* (2013.01); *H04L 63/0428* (2013.01)
(58) Field of Classification Search
CPC .. H04L 63/0272; H04L 63/14; H04L 63/0428
See application file for complete search history.

(56) References Cited

U.S. PATENT DOCUMENTS

2005/0102525 A1* 5/2005 Akimoto ............. H04L 63/0236
713/187
2007/0217424 A1 9/2007 Kim et al.
(Continued)

FOREIGN PATENT DOCUMENTS

KR 10-2004-0055286 A 6/2004
KR 10-0748698 B1 8/2007
KR 10-2012-0044002 A 5/2012

OTHER PUBLICATIONS

Microsoft, "Virtual Private Networking: An Overview," Published Sep. 4, 2001, Accessed Sep. 30, 2015 at [https://technet.microsoft.com/en-us/library/bb742566(d=printer).aspx], 10 pages.*

*Primary Examiner* — Robert Leung
(74) *Attorney, Agent, or Firm* — LRK Patent Law Firm

(57) ABSTRACT

A packet analysis apparatus and method and a VPN server, which secure evidence against a situation in which a hacker disguises a packet as a normal packet to make an attack using a VPN server as a router. The packet analysis apparatus includes a packet classification unit for gathering and classifying packets which are used between a host and the VPN server and plaintext packets which are used between the VPN server and a target. A first comparative analysis unit compares contents of an encapsulated IP datagram of each encrypted VPN packet, obtained by decrypting the encrypted VPN packet, with contents of a plaintext IP datagram included in each plaintext packet and present for a target to which the host desires to transfer the encrypted VPN packet. A second comparative analysis unit compares lengths of the encapsulated IP datagram and the plaintext IP datagram with each other.

19 Claims, 10 Drawing Sheets

(56) References Cited

U.S. PATENT DOCUMENTS

| | | | |
|---|---|---|---|
| 2009/0144806 A1* | 6/2009 | Gal | H04L 63/083 726/3 |
| 2010/0088766 A1* | 4/2010 | Michaely | H04L 63/1466 726/23 |
| 2010/0169479 A1* | 7/2010 | Jeong | H04L 63/1416 709/224 |
| 2012/0109969 A1 | 5/2012 | Gil et al. | |

* cited by examiner

PACKET ANALYSIS APPARATUS AND METHOD AND VIRTUAL PRIVATE NETWORK SERVER

CROSS REFERENCE TO RELATED APPLICATION

This application claims the benefit of Korean Patent Application No. 10-2014-002912, filed Jan. 9, 2014, which is hereby incorporated by reference in its entirety into this application.

BACKGROUND OF THE INVENTION

1. Technical Field

The present invention relates generally to a packet analysis apparatus and method and a Virtual Private Network (VPN) server. More particularly, the present invention relates to a packet analysis apparatus and method and a VPN server, which secure evidence against a situation in which a hacker disguises a packet as a normal packet so as to make an attack using a VPN server as a router for the purpose of disguising his or her access location and concealing an action.

2. Description of the Related Art

Recently, as a large number of methods for disguising packets as normal packets by utilizing a VPN server, which supports tunneling and encryption, as a router have been utilized in order to conceal locations and actions, the analysis of such methods is required, but it is not easy to effectively analyze such methods because data and packets are encrypted.

In detail, in order to prove that a hacker uses a Microsoft Point to Point Encryption (MPPE)-based Point to Point Tunneling Protocol (PPTP) VPN server as a router and disguises a packet as a normal packet for the purpose of disguising his or her access location and concealing actions so as to effectively make a cyber attack, it should be verified whether an Internet Protocol (IP) datagram encapsulated in an encrypted VPN packet between the hacker and the VPN server is identical to a plaintext IP datagram between the VPN server and a target.

The most intuitive method of verifying whether the encrypted and encapsulated IP datagram is identical to the plaintext IP datagram is a method of decrypting the encrypted IP datagram, comparing the decrypted IP datagram with the plaintext IP datagram, and verifying the identity between them.

However, in order to decrypt an MPPE packet, a session key used for encryption must be detected, and a password used to log in to the VPN is required so as to detect such a session key.

Since a password is present as a hash value in monitored data, it is not known, and it must be detected via password cracking, and thus decryption is not always successfully performed.

Therefore, there is required a method of verifying whether a VPN packet is identical to a plaintext packet even if decryption has failed. Meanwhile, in the case of an MPPE encryption technique, there is no change in the length of data before and after the encryption of the data, and so identity can be verified via a comparison between the lengths of packets if decryption is impossible.

Therefore, there are currently required a packet analysis apparatus and method and a VPN server to which both a component for comparing the contents of packets and a component for comparing the lengths of packets are applied so that the identity can be verified even if decryption has failed.

As related technology, Korean Patent Application Publication No 2012-0044002 is disclosed.

SUMMARY OF THE INVENTION

Accordingly, the present invention has been made keeping in mind the above problems occurring in the prior art, and an object of the present invention is to enable the verification of whether a VPN packet is identical to a normal packet by comparing the contents of the VPN packet and the normal packet with each other while comparing the lengths of the VPN packet and the normal packet with each other, based on a VPN server.

Another object of the present invention is to contribute to the securing of evidence required for cyber investigation by comparing a VPN packet with a normal packet via a comparison between the lengths of the packets even if the VPN packet is encrypted and cannot be decrypted.

A further object of the present invention is to utilize an automated session key reconstruction method for decryption upon comparing the contents of a VPN packet and a normal packet with each other, thus enabling a large amount of monitored data (VPN packets) to be rapidly decrypted within a short period of time.

In accordance with an aspect of the present invention to accomplish the above objects, there is provided a packet analysis apparatus for analyzing packets collected by a Microsoft Point to Point Encryption (MPPE)-based Point to Point Tunneling Protocol (PPTP) Virtual Private Network (VPN) server, including packet classification unit for gathering and classifying packets into encrypted VPN packets which are used between a host and the VPN server and plaintext packets which are used between the VPN server and a target, a first comparative analysis unit for comparing contents of an encapsulated Internet Protocol (IP) datagram of each encrypted VPN packet, obtained by decrypting the encrypted VPN packet, with contents of a plaintext IP datagram that is included in each plaintext packet and that is present for a target to which the host desires to transfer the encrypted VPN packet, and a second comparative analysis unit for comparing lengths of the encapsulated IP datagram and the plaintext IP datagram with each other.

The packet classification unit may include a PPTP packet classification unit for pairing a source and a destination and classifying the encrypted VPN packets by connection session ranging from start to end of a PPTP connection.

The packet classification unit may further include a plaintext packet classification unit for pairing a source IP address-destination IP address and a source port-destination port, classifying the plaintext packets, and then generating plaintext packet lists for respective sessions.

The second comparative analysis unit may be designated to be operated when the first comparative analysis unit cannot decrypt each encrypted VPN packet.

The first comparative analysis unit may include a password cracking unit for extracting Username, Point to Point Protocol (PPP) Challenge Handshake Authentication Protocol (CHAP) Challenge, and PPP CHAP Response values from an authentication packet of a PPTP packet list related to the encrypted VPN packet, and cracking a password based on a rainbow list.

The first comparative analysis unit may further include a key reconstruction unit for reconstructing a master key and an initial transmission/reception session key based on the password cracked by the password cracking unit and the PPP CHAP Response value.

The first comparative analysis unit may further include a decryption unit for reconstructing a session key for a corresponding session by encrypting the initial transmission/reception session key, reconstructed by the key reconstruction unit, using a Rivest Cipher 4 (RC4) algorithm in response to a value of a count field of an MPPE header present in the encrypted VPN packet that is a target to be comparatively analyzed, and thereafter decrypting an encapsulated IP datagram contained in the encrypted VPN packet.

The first comparative analysis unit may further include a session list extraction unit for, as the encrypted VPN packet is decrypted by the decryption unit, extracting session information from a decrypted IP header and extracting a session list matching a source IP address from the plaintext packet lists for respective sessions.

The first comparative analysis unit may further include an identity determination unit for comparing IP datagrams of the plaintext packet list with the decrypted IP datagram in response to the session list extracted by the session list extraction unit and determining whether there is an identical IP datagram.

The second comparative analysis unit may include a first calculation unit for calculating a length of an encapsulated IP datagram contained in an encrypted PPP payload of the encrypted VPN packet, and the first calculation unit calculates a value, obtained by subtracting a length of an IP header, a length of a Generic Routing Encapsulation (GRE) header, a length of a PPP protocol field, a length of an MPPE header, and a length of a protocol field from an overall length of the VPN packet, as the length of the encapsulated IP datagram.

The second comparative analysis unit may further include a second calculation unit for calculating a length of the plaintext IP datagram, and the second calculation unit calculates the length of the plaintext IP datagram as a value of a total length field of an IP header in the plaintext IP datagram.

The packet analysis apparatus may further include an output unit for, if it is determined by the first comparative analysis unit that the contents of the encapsulated IP datagram and the plaintext IP datagram are identical to each other, outputting a VPN packet corresponding to the encapsulated IP datagram and a plaintext packet corresponding to the plaintext IP datagram.

The output unit may be configured to, if it, is determined by the second comparative analysis unit that the lengths of the encapsulated IP datagram and the plaintext IP datagram are identical to each other, output a VPN packet corresponding to the encapsulated IP datagram and a plaintext packet corresponding to the plaintext IP datagram.

In accordance with another aspect of the present invention to accomplish the above objects, there is provided a packet analysis method for analyzing packets collected by a Microsoft Point to Point Encryption (MPPE)-based Point to Point Tunneling Protocol (PPTP) Virtual Private Network (VPN) server, including gathering and classifying, by a packet classification unit, packets into encrypted VPN packets which are used between a host and the VPN server and plaintext packets which are used between the VPN server and a target, comparing, by a first comparative analysis unit, contents of an encapsulated Internet Protocol (IP) datagram of each encrypted VPN packet, obtained, by decrypting the encrypted VPN packet, with contents of a plaintext IP datagram that is included in each plaintext packet and that is present for a target to which the host desires to transfer the encrypted VPN packet, and comparing, by a second comparative analysis unit, lengths of the encapsulated IP datagram and the plaintext IP datagram with each other.

Classifying the packets may include classifying, by a PPTP packet classification unit, the encrypted VPN packets by connection session ranging from start to end of a PPTP connection by pairing, a source and a destination, and classifying, by a plaintext packet classification unit, the plaintext packets by individually pairing a source IP address-destination IP address and, a source port-destination port, thus generating plaintext packet lists for respective sessions.

Classifying the contents may include cracking, by a password cracking unit, a password based on a rainbow list by extracting Username, Point to Point Protocol (PPP) Challenge Handshake Authentication Protocol (CHAP) Challenge, and PPP CHAP Response values from an authentication packet of a PPTP packet list related to each encrypted VPN packet, reconstructing, by a key reconstruction unit, a master key and an initial transmission/reception session key based on the cracked password and the PPP CHAP Response value, reconstructing, by a decryption unit, a session key for a corresponding session by encrypting the initial transmission/reception session key, reconstructed by the key reconstruction unit, using a Rivest Cipher 4 (RC4) algorithm in response to a value of a count field of an MPPE header present in the encrypted VPN packet that is a target to be comparatively analyzed, and thereafter decrypting, by the decryption unit, an encapsulated IP datagram contained in the encrypted VPN packet, as the encrypted VPN packet is decrypted at the decryption, extracting, by a session list extraction unit, session information from a decrypted IP header, and extracting, by the session list extraction unit, a session list matching a source IP address from the plaintext packet lists for respective sessions, and comparing, by an identity determination unit, IP datagrams of the plaintext packet list with the decrypted IP datagram in response to the extracted session list, and determining, by the identity determination unit, whether there is an identical IP datagram.

Comparing the lengths may include calculating, by a first calculation unit, a length of an encapsulated IP datagram contained in an encrypted PPP payload of the encrypted VPN packet, and calculating the length of the encapsulated IP datagram includes calculating a value, obtained by subtracting a length of an IP header, a length of a Generic Routing Encapsulation (GRE) header, a length of a PPP protocol field, a length of an MPPE header, and a length of a protocol field from an overall length of the VPN packet, as the length of the encapsulated IP datagram.

Comparing the lengths may include calculating, by a second calculation unit, a length of the plaintext IP datagram, and calculating the length of the plaintext IP datagram may include calculating the length of the plaintext IP datagram as a value of a total length field of an IP header in the plaintext IP datagram.

The packet analysis method may further include, if it is determined upon comparing the contents that the contents of the encapsulated IP datagram and the plaintext IP datagram are identical to each other, outputting, by an output unit, a VPN packet corresponding to the encapsulated IP datagram and a plaintext packet corresponding to the plaintext IP datagram, wherein outputting the VPN packet and the plaintext packet includes, if it is determined upon comparing the lengths that the lengths of the encapsulated IP datagram and the plaintext IP datagram are identical to each other, outputting a VPN packet corresponding to the encapsulated IP datagram and a plaintext packet corresponding to the plaintext IP datagram.

In accordance with a further aspect of the present invention to accomplish the above objects, there is provided a Virtual Private Network (VPN) server, including a packet classification unit for gathering and classifying packets into encrypted VPN packets which are used between a host and the VPN server and plaintext packets which are used between the VPN server and a target, a first comparative analysis unit for comparing contents of an encapsulated Internet Protocol (IP) datagram of each encrypted VPN packet, obtained by decrypting the encrypted VPN packet, with contents of a plaintext IP datagram that is included in each plaintext packet and that is present for a target to which the host desires to transfer the encrypted VPN packet, and a second comparative analysis unit for comparing lengths of the encapsulated IP datagram and the plaintext IP datagram with each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
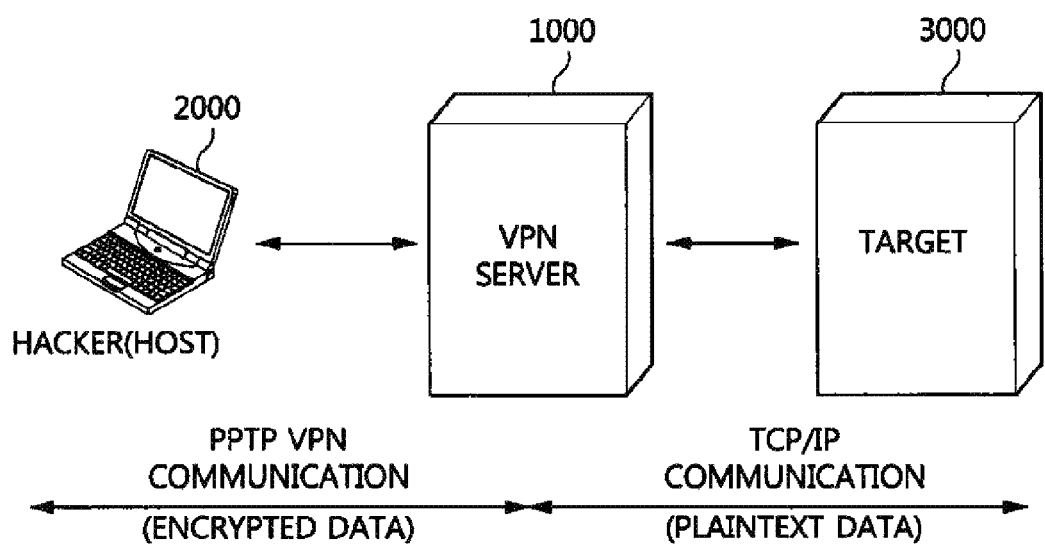
FIG. 1 is a system configuration diagram showing a packet analysis apparatus according to the present invention.

The present invention will be described in detail below with reference to the accompanying drawings. Repeated descriptions and descriptions of known functions and configurations which have been deemed to make the gist of the present invention unnecessarily obscure will be omitted below.

The embodiments of the present invention are intended to fully describe the present invention to a person having ordinary knowledge in the art to which the present invention pertains. Accordingly, the shapes, sizes, etc. of components in the drawings may be exaggerated to make the description clearer.

Further, in the description of the components of the present invention, the terms such as first, second, A, B, (a), and (b) may be used. Such terms are merely intended to distinguish a specific component from other components and are not intended to limit the essential features, order, or sequential position of the corresponding component.

Hereinafter, the system configuration of a packet analysis apparatus according to the present invention to accomplish the above objects will be described in detail with reference to the attached drawings.

Figure 5:
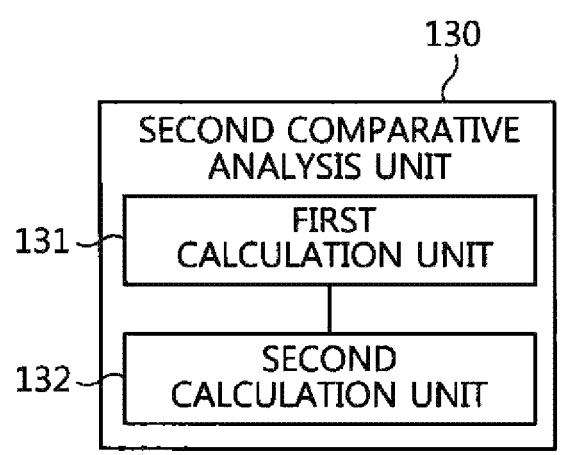
FIG. 5 is a diagram showing an embodiment of the second comparative analysis unit of the packet analysis apparatus according to the present invention.
Figure 6:
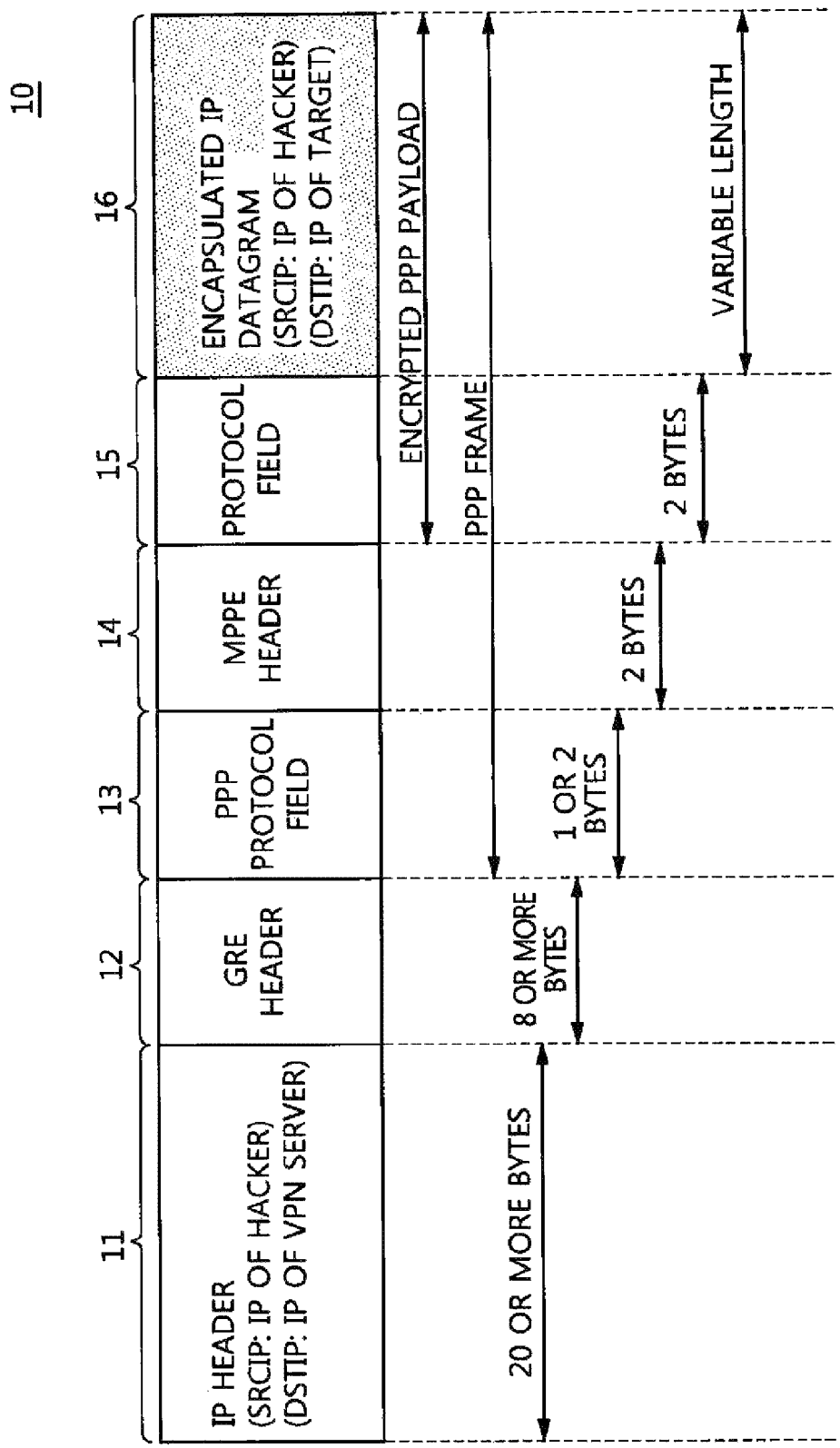
FIG. 6 is a diagram showing the structure of an MPPE-based encrypted PPTP VPN packet.

FIG. 1 is a system configuration diagram showing a packet analysis apparatus according to the present invention. FIG. 5 is a diagram showing the structure of a Microsoft Point to Point Encryption (MPPE)-based encrypted Point to Point Tunneling Protocol (PPTP) Virtual Private Network (VPN) packet. FIG. 6 is a diagram showing the structure of a plaintext IP datagram.

The number of security incidents in which a hacker utilizes a VPN server as a router so as to conceal his or her location and action has increased.

When a description is made with reference to FIG. 1, a hacker (host) 2000 goes by way of an intermediate VPN server 100 and disguises a packet so as to conceal his or her location, and transfers the disguised packet to a desired target 3000, without directly accessing the target 3000 and conducting malicious behavior such as uploading or downloading malicious code.

First, after the packet of the hacker 2000 having the original target 3000 as a destination has been encapsulated, the encapsulated packet is encrypted using a negotiated VPN tunneling protocol, and the encrypted packet is transmitted to a VPN server 1000.

In greater detail, encrypted data is used between the hacker (host) 2000 and the VPN server 1000 via PPTP VPN communication, and plaintext data is used between the VPN server 1000 and the target 3000 via Transmission Control Protocol/Internet Protocol (TCP/IP) communication.

Referring to FIG. 6, an original IP datagram desired by the hacker to be transmitted to the target is encrypted, encapsulated, and generated as an encapsulated IP datagram 16 present in a VPN packet 10, and the encapsulated IP datagram 16 is transmitted.

In this case, since the destination of the IP header 11 of the VPN packet 10 is set to the IP address of the VPN server, it cannot be known that the VPN packet 10 is a packet that is ultimately transmitted to the target.

Figure 7:
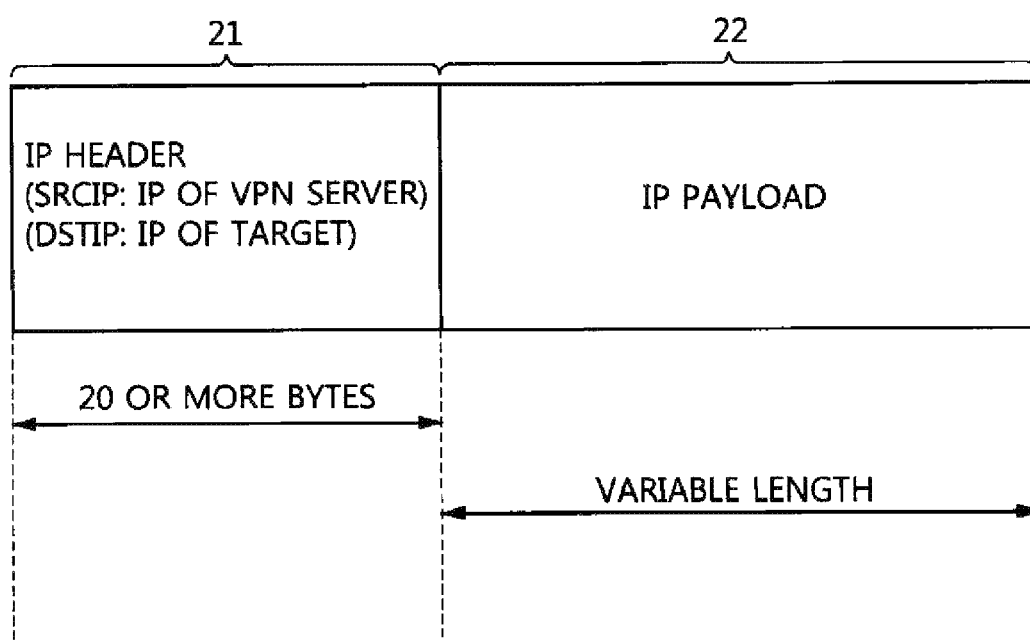
FIG. 7 is a diagram showing the structure of a plaintext IP datagram.

The VPN server receives the encrypted packet, decrypts the packet, reconstructs the encapsulated IP datagram 16, and transmits, to the target, a plaintext IP datagram 20, the IP header 21 of which is revised such that a source address is the VPN server and a destination address is the target, as shown in the IP header shown in FIG. 7 as if the VPN server sends the datagram to the target.

Consequently, the encapsulated IP datagram 16 in the encrypted VPN packet 10 between the hacker and the VPN server and the plaintext IP datagram 20 between the VPN server and the target are packets having the same data sent by the hacker to the target. However, it is difficult to verify the identity between the two packets without detailed analysis of association between them due to tunneling and encryption. Therefore, the present invention presents a method of verifying the identity between two packets so as to prove encapsulation and disguise by the hacker.

Below, a packet analysis apparatus according to the present invention will be described in detail with reference to the attached drawings.

Figure 2:
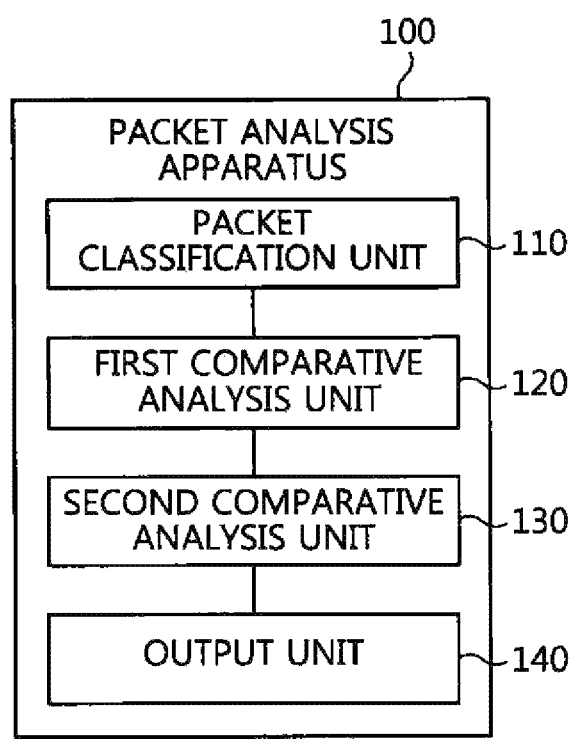
FIG. 2 is a block diagram showing a packet analysis apparatus according to the present invention.
Figure 3:
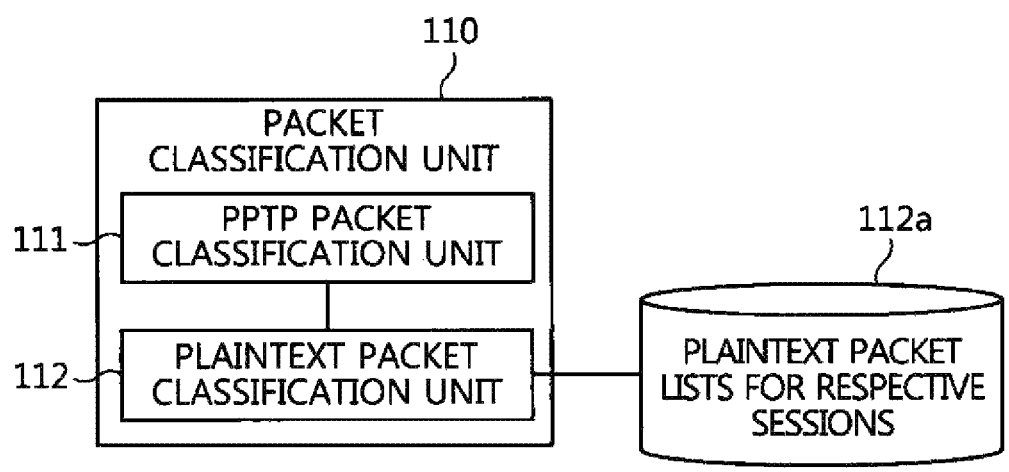
FIG. 3 is a diagram showing an embodiment of the packet classification unit of the packet analysis apparatus according to the present invention.
Figure 4:
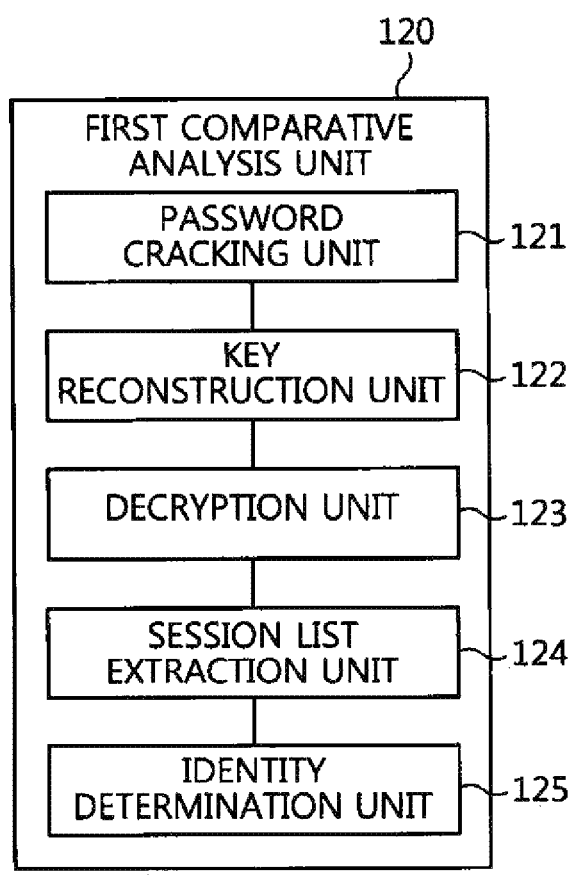
FIG. 4 is a diagram showing an embodiment of the first comparative analysis unit of the packet analysis apparatus according to the present invention.

FIG. 2 is a block diagram showing a packet analysis apparatus according to the present invention. FIG. 3 is a diagram showing an embodiment of the packet classification unit of the packet analysis apparatus according to the present invention. FIG. 4 is a diagram showing an embodiment of the first comparative analysis unit of the packet analysis apparatus according to the present invention. FIG. 5 is a diagram showing an embodiment of the second comparative analysis unit of the packet analysis apparatus according to the present invention. FIG. 6 is a diagram showing the structure of an MPPE-based encrypted PPTP VPN packet. FIG. 7 is a diagram showing the structure of a plaintext IP datagram.

Referring to FIG. 2, a packet analysis apparatus 100 according to the present invention includes a packet classification unit 110, a first comparative analysis unit 120, a second comparative analysis unit 130, and an output unit 140.

In greater detail, the packet analysis apparatus 100 according to the present invention is an apparatus for analyzing packets collected by an MPPE-based PPTP VPN server. The packet classification unit 110 gathers and classifies the packets into encrypted VPN packets which are used between a host and the VPN server and plaintext packets which are used between the VPN server and a target. The first comparative analysis unit 120 compares the contents of the encapsulated IP datagram of each encrypted VPN packet, which is obtained by decrypting the encrypted VPN packet, with the contents of a plaintext IP datagram, which is included in the corresponding plaintext packet and is present for the target to which the host desires to transfer the encrypted VPN packet. The second comparative analysis unit 130 compares the lengths of the encapsulated IP datagram and the plaintext IP datagram with each other.

In this case, the packet analysis apparatus may further include the output unit 140 for, if it is determined by the first comparative analysis unit 120 that the contents of the encapsulated IP datagram and the plaintext IP datagram are identical to each other, outputting a VPN packet corresponding to the encapsulated IP datagram and a plaintext packet corresponding to the plaintext IP datagram. If it is determined by the second comparative analysis unit 130 that the lengths of the encapsulated IP datagram and the plaintext IP datagram are identical to each other, the output unit 140 may output a VPN packet corresponding to the encapsulated IP datagram and a plaintext packet corresponding to the plaintext IP datagram.

Referring to FIG. 3, the packet classification unit 110 may include a PPTP packet classification unit 111 and a plaintext packet classification unit 112.

In greater detail, the PPTP packet classification unit 111 performs the function of pairing a source and a destination and classifying the encrypted VPN packets by connection session ranging from the start to the end of a PPTP connection.

Further, the plaintext packet classification unit 112 performs the function of pairing a source IP address-destination IP address and a source port-destination port, classifying the plaintext packets, and then generating plaintext packet lists 112a for respective sessions.

That is, the packet analysis apparatus 100 according to the present invention receives monitored packet data from the VPN server, and transfers the packet data to the PPTP packet classification unit 111 and to the plaintext packet classification unit 112.

In this case, the PPTP packet classification unit 111 classifies packets by connection session ranging from the start to end of a PPTP connection using a source-destination pair and stores each PPTP packet for a target IP for which evidence is to be secured.

Further, the plaintext packet classification unit 112 classifies packets using a source IP address-destination IP address pair and a source port-destination port pair, and separately stores the classified packets.

When a description is made with reference to FIG. 4, the first comparative analysis unit 120 may include a password cracking unit 121, a key reconstruction unit 122, a decryption unit 123, a session list extraction unit 124, and an identity determination unit 125.

In greater detail, the password cracking unit 121 performs the function of extracting Username, Point to Point Protocol (PPP) Challenge Handshake Authentication Protocol (CHAP) Challenge, and PPP CHAP Response values from the authentication packet of a PPTP packet list related to the encrypted VPN packet, and cracking a password based on a rainbow list.

The key reconstruction unit 122 performs the function of reconstructing a master key and an initial transmission/reception session key based on the password cracked by the password cracking unit 121 and the PPP CHAP Response value.

The decryption unit 123 functions to reconstruct a session key for the corresponding session by encrypting the initial transmission/reception session key, reconstructed by the key reconstruction unit 122, using a Rivest Cipher 4 (RC4) algorithm in response to the value of the count field of an MPPE header present in the encrypted VPN packet that is a target to be comparatively analyzed, and thereafter decrypt the IP datagram encapsulated in the encrypted VPN packet.

The session list extraction unit 124 performs the function of as the encrypted VPN packet is decrypted by the decryption unit 123, extracting session information from the decrypted IP header, and extracting a session list matching the source IP address from the plaintext packet lists for respective sessions.

The identity determination unit 125 performs the function of comparing the IP datagrams of the plaintext packet list with the decrypted IP datagram in response to the session list extracted by the session list extraction unit 124 and determining whether there is an identical IP datagram.

The second comparative analysis unit 130 functions to compare the lengths of the encapsulated IP datagram and the plaintext IP datagram with each other. As described above, if the first comparative analysis unit 120 cannot decrypt the encrypted VPN packet upon verifying identity, the second comparative analysis unit may be designated to be operated.

That is, there is an advantage in that, even if the comparison between the contents cannot be performed by the first comparative analysis unit 120, the comparison between lengths can be performed by the second comparative analysis unit 130.

When a description is made with reference to FIG. 5, the second comparative analysis unit 130 may be configured to include a first calculation unit 131 and a second calculation unit 132.

In greater detail, the first calculation unit 131 functions to calculate the length of an encapsulated IP datagram contained in the encrypted PPP payload of the encrypted VPN packet.

In this case, referring to FIG. 6, the first calculation unit 131 may calculate a value, obtained by subtracting the length of an IP header 11, the length of a Generic Routing Encapsulation (GRE) header 12, the length of a PPP protocol field 13, the length of an MPPE header 14, and the length of a protocol field 15 from the overall length of the VPN packet 10, as the length of the encapsulated IP datagram 16.

Below, the structure of an MPPE-based encrypted PPTP VPN packet will be described in detail with reference to FIG. 6. The VPN packet 10 includes the IP header 11, the GRE header 12, the PPP protocol field 13, the MPPE header 14, the protocol field 15, and the encapsulated IP datagram 16.

In this case, 20 or more bytes are allocated to the IP header 11, 8 or more bytes are allocated to the GRE header 12, 1 or 2 bytes are allocated to the PPP protocol field 13, 2 bytes are allocated to the MPPE header 14, and 2 bytes are allocated to the protocol field 15. The encapsulated IP datagram 16 has a variable length.

Further, the protocol field 15 and the encapsulated IP datagram 16 correspond to the encrypted PPP payload, and the PPP protocol 13 to the encapsulated IP datagram 16 correspond to a PPP frame.

Meanwhile, the second comparative analysis unit 130 may include the second calculation unit 132 for calculating, the length of the plaintext IP datagram. In this case, referring to FIG. 7, the second calculation unit 132 may calculate the length of a plaintext IP datagram 20 as the value of the total length field of the IP header 21 of the plaintext IP datagram 20.

Hereinafter, a packet analysis method according to the present invention will be described in detail. A repeated description of components identical to those of the packet analysis apparatus 100 according to the present invention will be omitted.

Figure 8:
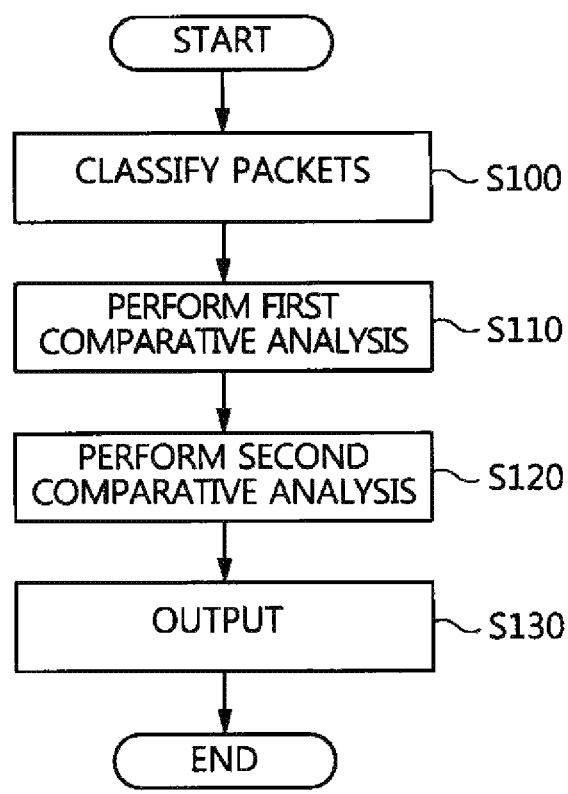
FIG. 8 is a flowchart showing a packet analysis method according to the present invention.
Figure 9:
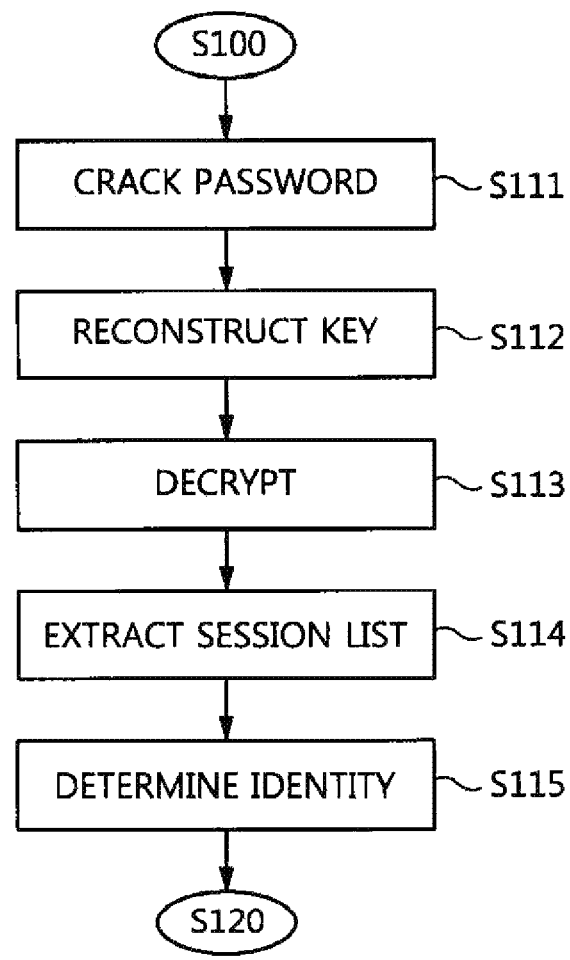
FIGS. 9 and 10 are flowcharts showing embodiments of the packet analysis method according to the present invention.
Figure 10:
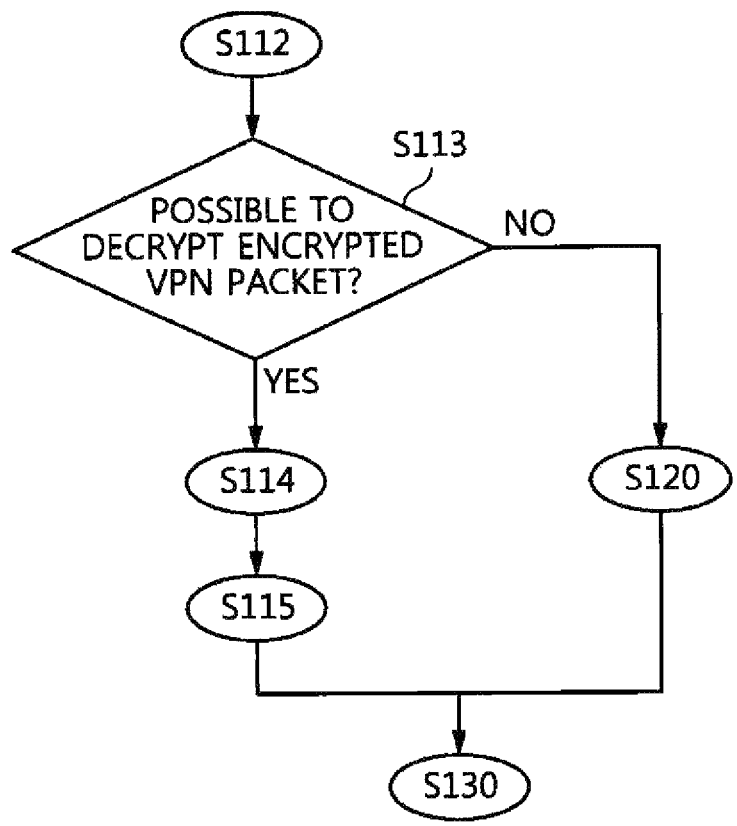

FIG. 8 is a flowchart showing a packet analysis method according to the present invention. FIGS. 9 to 10 are flowcharts showing embodiments of the packet analysis method according to the present invention.

Referring to FIG. 8, the packet analysis method according to the present invention is a method of analyzing packets collected by an MPPE-based PPTP VPN server, and includes packet classification step S100, first comparative analysis step S110, and second comparative analysis step S120. At the packet classification step S100, the packet classification unit gathers and classifies packets into encrypted VPN packets which are used between a host and the VPN server and plaintext packets which are used between the VPN server and a target. At the first comparative analysis step S110, the first comparative analysis unit compares the contents of the encapsulated IP datagram of each encrypted VPN packet, which is obtained by decrypting the encrypted VPN packet, with the contents of a plaintext IP datagram, which is included in the corresponding plaintext packet and is present for the target to which the host desires to transfer the encrypted VPN packet. At the second comparative analysis step S120, the second comparative analysis unit 130 compares the lengths of the encapsulated IP datagram and the plaintext IP datagram with each other.

The packet analysis method may further include, after step S120, the output step S130 of, if it is determined at the first comparative analysis step S110 that the contents of the encapsulated IP datagram and the plaintext IP datagram are identical to each other, outputting, by the output unit, a VPN packet corresponding to the encapsulated IP datagram and a plaintext packet corresponding to the plaintext IP datagram. In this case, at the output step S130, if it is determined at the second comparative analysis step S120 that the lengths of the encapsulated IP datagram and the plaintext IP datagram are identical to each other, a VPN packet corresponding to the encapsulated IP datagram and a plaintext packet corresponding to the plaintext IP datagram may be output.

An embodiment of the step S110 of the packet analysis method according to the present invention will be described below with reference to FIG. 9. After step S100, password cracking step S111 is performed at which the password cracking unit extracts Username, Point to Point Protocol (PPP) Challenge Handshake Authentication Protocol (CHAP) Challenge, and PPP CHAP Response values from the authentication packet of a PPTP packet list related to the encrypted VPN packet and then cracks a password based on a rainbow list.

Further, after step S111, key reconstruction step S112 is performed at which the key reconstruction unit reconstructs a master key and an initial transmission/reception session key based on the password cracked at the password cracking step and the PPP CHAP Response value. Thereafter, decryption step S113 may be performed at which the decryption unit reconstructs a session key for the corresponding session by encrypting the initial transmission/reception session key, reconstructed by the key reconstruction unit, using an RC4 algorithm in response to the value of the count field of an MPPE header present in the encrypted VPN packet that is a target to be comparatively analyzed, and thereafter decrypts the IP datagram encapsulated in the encrypted VPN packet.

After step S113, session list extraction step S114 is performed at which, as the encrypted VPN packet is decrypted at the decryption step, the session list extraction unit extracts session information from the decrypted IP header, and extracts a session list matching the source IP address from the plaintext packet lists for respective sessions. After step S114, identity determination step S115 is performed at which the identity determination unit compares the IP datagrams of the plaintext packet list with the decrypted IP datagram in response to the session list extracted at the session list extraction step and determines whether there is an identical IP datagram.

Another embodiment of the packet analysis method according to the present invention will be described with reference to FIG. 10. After step S112, it is determined whether an encrypted VPN packet can be decrypted at step S113.

As described above, in order to decrypt the MPPE packet, a session key used for encryption must be detected. In order to detect such a session key, a password used upon logging in to the VPN is required. Since the password is present as a hash value on the monitored data of the VPN server, it cannot be known and it must be detected via password cracking, and thus the decryption of the packet does not always succeed. Therefore, the process may be designed such that, if it is determined at step S113 that decryption cannot be performed, the step S120 of comparing the length of packets is performed, whereas if it is determined at step S113 that decryption can be performed, the steps S114 and S115 of FIG. 9 are performed.

Below, a VPN server according to the present invention will be described. As described above, a repeated description of components identical to those of the packet analysis apparatus according to the present invention will be omitted.

That is, the VPN server according to the present invention denotes a server including the components of the above-described packet analysis apparatus when the packet analysis apparatus is not separately provided.

As described above, in accordance with the packet analysis apparatus and method and the VPN server according to the present invention, there is an advantage in that identity between a VPN packet and a normal packet can be verified by comparing the contents of the VPN packet and the normal packet with each other based on the VPN server while comparing the lengths of the VPN packet and the normal packet with each other.

In accordance with the present invention, there is an advantage in that it can be verified that a VPN packet is identical to a normal packet by comparing the contents of the VPN packet and the normal packet with each other while comparing the lengths of the VPN packet and the normal packet with each other, based on a VPN server.

Further, in accordance with the present invention, there is an advantage in that it can contribute to the securing of evidence required for cyber investigation by comparing a VPN packet with a normal packet via a comparison between the lengths of the packets even if the VPN packet is encrypted and cannot be decrypted.

Furthermore, in accordance with the present invention, there is an advantage in that it utilizes an automated session key reconstruction method for decryption upon comparing the contents of a VPN packet and a normal packet with each other, thus enabling a large amount of monitored data (VPN packets) to be rapidly decrypted within a short period of time.

As described above, in the packet analysis apparatus and method and the VPN server according to the present invention, the configurations and schemes in the above-described embodiments are not limitedly applied, and some or all of the above embodiments can be selectively combined and configured so that various modifications are possible.

What is claimed is:

1. A packet analysis apparatus for analyzing packets collected by a Microsoft Point to Point Encryption (MPPE)-based Point to Point Tunneling Protocol (PPTP) Virtual Private Network (VPN) server, comprising:
   at least one hardware processor and a storage;
   a packet classifier which is loaded on the at least one hardware processor and gathers and classifies packets into encrypted VPN packets which are used between a host and the VPN server and plaintext packets which are used between the VPN server and a target;
   a first comparative analyzer which is loaded on the at least one hardware processor and compares contents of an encapsulated Internet Protocol (IP) datagram of each encrypted VPN packet, obtained by decrypting the encrypted VPN packet, with contents of a plaintext IP datagram that is included in each plaintext packet and that is present for a target to which the host desires to transfer the encrypted VPN packet; and
   a second comparative analyzer which is loaded on the at least one hardware processor and compares lengths of the encapsulated IP datagram and the plaintext IP datagram with each other.

2. The packet analysis apparatus of claim 1, wherein the packet classifier comprises a PPTP packet classification unit for pairing a source and a destination and classifying the encrypted VPN packets by connection session ranging from start to end of a PPTP connection.

3. The packet analysis apparatus of claim 2, wherein the packet classifier further comprises a plaintext packet classification unit for pairing a source IP address-destination IP address and a source port-destination port, classifying the plaintext packets, and then generating plaintext packet lists for respective sessions.

4. The packet analysis apparatus of claim 1, wherein the second comparative analyzer is designated to be operated when the first comparative analyzer cannot decrypt each encrypted VPN packet.

5. The packet analysis apparatus of claim 3, wherein the first comparative analyzer comprises a password cracking unit for extracting Username Point to Point Protocol (PPP) Challenge Handshake Authentication Protocol (CHAP) Challenge, and PPP CHAP Response values from an authentication packet of a PPTP packet list related to the encrypted VPN packet, and cracking a password based on a rainbow list.

6. The packet analysis apparatus of claim 5, wherein the first comparative analyzer further comprises a key reconstruction unit for reconstructing a master key and an initial transmission/reception session key based on the password cracked by the password cracking unit and the PPP CHAP Response value.

7. The packet analysis apparatus of claim 6, wherein the first comparative analyzer further comprises a decryption unit for reconstructing a session key for a corresponding session by encrypting the initial transmission/reception session key, reconstructed by the key reconstruction unit, using a Rivest Cipher 4 (RC4) algorithm in response to a value of a count field of an MPPE header present in the encrypted VPN packet that is a target to be comparatively analyzed, and thereafter decrypting an encapsulated IP datagram contained in the encrypted VPN packet.

8. The packet analysis apparatus of claim 7, wherein the first comparative analyzer further comprises a session list extraction unit for, as the encrypted VPN packet is decrypted by the decryption unit, extracting session information from a decrypted IP header and extracting a session list matching a source IP address from the plaintext packet lists for respective sessions.

9. The packet analysis apparatus of claim 8, wherein the first comparative analyzer further comprises an identity determination unit for comparing IP datagrams of the plaintext packet list with the decrypted IP datagram in response to the session list extracted by the session list extraction unit and determining whether there is an identical IP datagram.

10. The packet analysis apparatus of claim 1, wherein:
    the second comparative analyzer comprises a first calculation unit for calculating a length of an encapsulated IP datagram contained in an encrypted PPP payload of the encrypted VPN packet, and
    the first calculation unit calculates a value, obtained by subtracting a length of an IP header, a length of a Generic Routing Encapsulation (GRE) header, a length of a PPP protocol field, a length of an MPPE header, and a length of a protocol field from an overall length of the VPN packet, as the length of the encapsulated IP datagram.

11. The packet analysis apparatus of claim 10, wherein:
    the second comparative analyzer further comprises a second calculation unit for calculating a length of the plaintext IP datagram, and
    the second calculation unit calculates the length of the plaintext IP datagram as a value of a total length field of an IP header in the plaintext IP datagram.

12. The packet analysis apparatus of claim 1, further comprising an output unit for, if it is determined by the first comparative analyzer that the contents of the encapsulated IP datagram and the plaintext IP datagram are identical to each other, outputting a VPN packet corresponding to the encapsulated IP datagram and a plaintext packet corresponding to the plaintext IP datagram.

13. The packet analysis apparatus of claim 12, wherein the output unit is configured to, if it is determined by the second comparative analyzer that the lengths of the encapsulated IP datagram and the plaintext IP datagram are identical to each other, output a VPN packet corresponding to the encapsulated IP datagram and a plaintext packet corresponding to the plaintext IP datagram.

14. A packet analysis method for analyzing packets collected by a Microsoft Point to Point Encryption (MPPE)-based Point to Point Tunneling Protocol (PPTP) Virtual Private Network (VPN) server, comprising:
    gathering and classifying, by a packet classifier, packets into encrypted VPN packets which are used between a host and the VPN server and plaintext packets which are used between the VPN server and a target;
    comparing, by a first comparative analyzer, contents of an encapsulated Internet Protocol (IP) datagram of each encrypted VPN packet, obtained by decrypting the encrypted VPN packet, with contents of a plaintext IP datagram that is included in each plaintext packet and that is present for a target to which the host desires to transfer the encrypted VPN packet, and comparing, by a second comparative analyzer, lengths of the encapsulated IP datagram and the plaintext IP datagram with each other.

15. The packet analysis method of claim 14, wherein classifying the packets comprises:
    classifying, by a PPTP packet classification unit, the encrypted VPN packets by connection session ranging from start to end of a PPTP connection by pairing a source and a destination; and
    classifying, by a plaintext packet classification unit, the plaintext packets by individually pairing a source IP address-destination IP address and a source port-destination port, thus generating plaintext packet lists for respective sessions.

16. The packet analysis method of claim 15, wherein classifying the contents comprises:
    cracking, by a password cracking unit, a password based on a rainbow list by extracting Username, Point to Point Protocol (PPP) Challenge Handshake Authentication Protocol (CHAP) Challenge, and PPP CHAP Response values from an authentication packet of a PPTP packet list related to each encrypted VPN packet;
    reconstructing, by a key reconstruction unit, a master key and an initial transmission/reception session key based on the cracked password and the PPP CHAP Response value;
    reconstructing, by a decryption unit, a session key for a corresponding session by encrypting the initial transmission/reception session key, reconstructed by the key reconstruction unit, using a Rivest Cipher 4 (RC4) algorithm in response to a value of a count field of an MPPE header present in the encrypted VPN packet that is a target to be comparatively analyzed, and thereafter decrypting, by the decryption unit, an encapsulated IP datagram contained in the encrypted VPN packet;
    as the encrypted VPN packet is decrypted at the decryption, extracting, by a session list extraction unit, session information from a decrypted IP header, and extracting, by the session list extraction unit, a session list matching a source IP address from the plaintext packet lists for respective sessions; and
    comparing, by an identity determination unit, IP datagrams of the plaintext packet list with the decrypted IP datagram in response to the extracted session list, and determining, by the identity determination unit, whether there is an identical IP datagram.

17. The packet analysis method of claim 14, wherein:
    comparing the lengths comprises calculating, by a first calculation unit, a length of an encapsulated IP datagram contained in an encrypted PPP payload of the encrypted VPN packet, and
    calculating the length of the encapsulated IP datagram comprises calculating a value, obtained by subtracting a length of an IP header, a length of a Generic Routing Encapsulation (GRE) header, a length of a PPP protocol field, a length of an MPPE header, and a length of a protocol field from an overall length of the VPN packet, as the length of the encapsulated IP datagram.

18. The packet analysis method of claim 17, wherein:
    comparing the lengths comprises calculating, by a second calculation unit, a length of the plaintext IP datagram, and
    calculating the length of the plaintext IP datagram comprises calculating the length of the plaintext IP datagram as a value of a total length field of an IP header in the plaintext IP datagram.

19. The packet analysis method of claim 14, further comprising, if it is determined upon comparing the contents that the contents of the encapsulated IP datagram and the plaintext IP datagram are identical to each other, outputting, by an output unit, a VPN packet corresponding to the encapsulated IP datagram and a plaintext packet corresponding to the plaintext IP datagram,
    wherein outputting the VPN packet and the plaintext packet comprises, if it is determined upon comparing the lengths that the lengths of the encapsulated IP datagram and the plaintext IP datagram are identical to each other, outputting a VPN packet corresponding to the encapsulated IP datagram and a plaintext packet corresponding to the plaintext IP datagram.

* * * * *